United States Patent [19]

Widen et al.

[11] Patent Number: 4,783,055
[45] Date of Patent: Nov. 8, 1988

[54] HOLOGRAPHIC INTERFEROMETER

[75] Inventors: Kenneth C. Widen, Topanga; Richard H. Burns, N. Hollywood, both of Calif.

[73] Assignee: Rockwell International Corporation, El Segundo, Calif.

[21] Appl. No.: 98,267

[22] Filed: Sep. 18, 1987

[51] Int. Cl.$^4$ .............................................. G01B 9/021
[52] U.S. Cl. .................................... 356/348; 356/363
[58] Field of Search ....................... 356/347, 348, 363

[56] References Cited

U.S. PATENT DOCUMENTS

| | | | |
|---|---|---|---|
| 3,672,776 | 6/1972 | Brooks | 356/106 |
| 3,828,126 | 8/1974 | Ramsey, Jr. | 178/6.8 |
| 3,953,129 | 4/1976 | Hildebrand | 356/348 |
| 3,997,266 | 12/1976 | Hildebrand | 356/348 |
| 4,396,289 | 8/1983 | Fantone | 356/348 |

OTHER PUBLICATIONS

J. C. Wyant, "Holographic and Moire Techniques", Optical Shop Testing, Chapter 12, pp. 381–389.

Primary Examiner—Davis L. Willis
Assistant Examiner—Matthew W. Koren
Attorney, Agent, or Firm—H. Fredrick Hamann; Harry B. Field; Lawrence N. Ginsberg

[57] ABSTRACT

A method and apparatus for testing an optical system 64 having an optical axis and a desired optical wavefront. A hologram is formed containing a recording of the desired optical wavefront. The hologram is located on the optical axis. When the hologram 50 is played back, the desired optical wavefront 62 is produced and directed toward the optical system 64. Wavefront 62 is retroreflected from the optical system 64 containing any of the system's aberrations. The retroreflected wavefront 66 is then passed through the hologram. A reference wavefront 60 is produced which is substantially conjugate to the desired optical wavefront. The reference wavefront 60 interferes with the retroreflected desired optical wavefront 66 thereby producing an interference fringe pattern characterizing the optical system under test.

17 Claims, 2 Drawing Sheets

HOLOGRAPHIC INTERFEROMETER

STATEMENT OF GOVERNMENT INTEREST

The Government has rights in this invention pursuant to Boeing Subcontract No. GL1066 (Prime DASG60-85-C-0076) awarded by the U.S. Department of the Air Force.

BACKGROUND OF THE INVENTION

1. Field of the Invention

This invention relates to holographic interferometry and more particularly to a method and apparatus for testing an aligning an optical system wherein the system under test is interrogated by a wavefront produced by a hologram and the wavefront returning from the system under test is compared to a reference wavefront which is also produced by the hologram.

2. Description of the Prior Art

Interferometry is a process wherein a light wavefront from a test object or system is interfered with a reference wavefront to produce a fringe pattern indicating differences of the test wavefront from the reference wavefront. Examples of interferometers include those described by Michelson, Twyman, Greene, Mach, Zender, and Fizeau.

Holography is a process by which the amplitude and phase variation across the wavefront from an object can be recorded photographically and subsequently reproduced. The photographic record of the wavefront is referred to as a hologram and the wavefront reproduced from the hologram is said to have been reconstructed.

Holographic interferometry has been performed using a holographically reconstructed wavefront as the interferometric reference wavefront. Examples of prior art holographic interferometric techniques are described in *Optical Shop Testing*, Chapter 12 by J. C. Wyant, pgs. 381–389; U.S. Pat. No. 3,672,776 issued to R. E. Brooks entitled "Holographic Real-Time Interferometry With a Reconstructed Reference Beam"; U.S. Pat. No. 4,396,289 issued to S. D. Fantone entitled "Method and Apparatus for Holographic Testing of Optical Components".

In all the above techniques, additional means are required to produce the proper wavefront needed to interrogate the system under test. Specifically, a lens is used to generate the proper vergence and a beamsplitter is used to combine the test and reference beams. These additional means result in added complexity and cost.

OBJECTS OF THE INVENTION

In view of the above, it is an object of the invention to provide a holographic interferometer for testing optical systems which is simpler and has fewer components than conventional means for testing these systems.

It is another object of the invention to allow the generation of the test wavefront at a more convenient prior time and place than allowed for by conventional methods.

Yet another object to provide a holographic interferometer which may be used in spatially constrained environments.

Still another object of the invention is to allow alignment of two optical systems with each other.

Other objects, advantages and novel features of the present invention will become apparent from the following detailed description of the invention when considered in conjunction with the accompanying drawing.

SUMMARY OF THE INVENTION

The invention, in its broadest aspects, comprises interrogating the system under test by a wavefront produced by a hologram. The wavefront returning from the system under test is compared to a reference wavefront which is also produced by the hologram. The hologram contains a recording of the desired optical wavefront of the optical system and is located on the optical axis of the optical system. The invention includes means for producing the desired optical wavefront. The desired optical wavefront is directed toward the optical system and retroreflected therefrom containing any aberrations of the optical system under test. The retroreflected wavefront is passed through the hologram. The invention also includes means for producing a reference wavefront which is substantially conjugate to the desired optical wavefront. The reference wavefront interferes with the retroreflected desired optical wavefront thereby producing an interference fringe pattern characterizing the optical system under test.

In its narrower aspects, the means for producing the desired optical wavefront includes means for forming a reconstruction wavefront. The reconstruction wavefront is directed through the hologram and is divided into a reconstructed object wavefront which is diffracted by the hologram and a transmitted wavefront which is transmitted by the hologram. The reconstructed object wavefront enters the optical system along the optical axis, is returned from the optical system and directed through the hologram conveying any aberrations of the optical system. Further, the means for producing the reference wavefront which is substantially conjugate to the desired optical wavefront incudes means for forming a wavefront which is substantially conjugate to the reconstruction wavefront. The substantially conjugate wavefront is directed through the hologram and thus forms a diffracted reconstructed conjugate object wavefront which interferes with the reconstructed object wavefront being returned from the optical system thereby producing the interference fringe pattern which characterizes the optical system under test.

BRIEF DESCRIPTION OF THE DRAWINGS

The same elements or parts throughout the figures of the drawings are designated by the same reference characters.

DETAILED DESCRIPTION OF THE INVENTION

Figure 1:
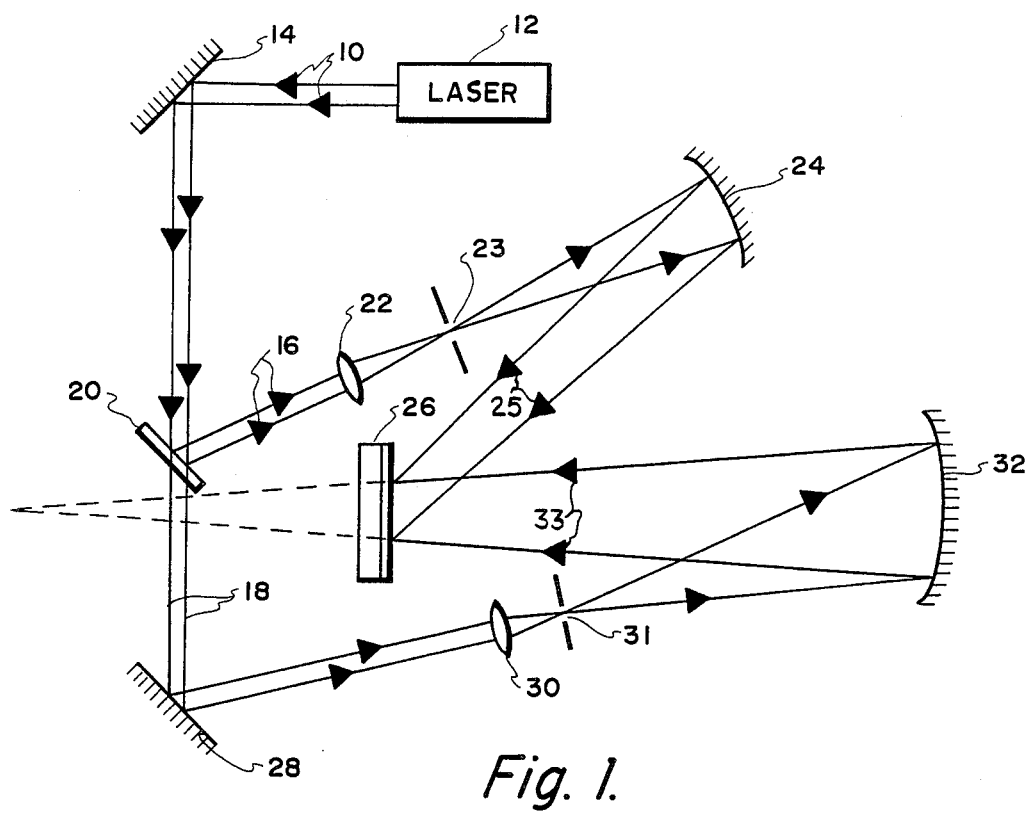
FIG. 1 is a schematic illustration of an example of an apparatus for recording a hologram which contains a record of the desired optical wavefront.

FIG. 1 schematically illustrates an example of an apparatus for recording a hologram to contain a record of the desired optical wavefront. Light 10 from a continuous wave or pulsed laser 12 is reflected from an alignment mirror 14 and then split into a construction reference beam 16 and a construction object beam 18 by a beam splitter 20. The construction reference beam 16 is directed through a lens 22, brought to a focal point at a pinhole 23 and then reflected from a spherical mirror 24 or other reflecting means to form a construction reference wavefront 25 which is directed toward a holographic plate 26. The construction object beam 18 is reflected from another alignment mirror 28, directed through a lens 30, brought to a focal point at pinhole 31 and toward another spherical mirror 32 or other reflecting means which is aligned to provide the proper wavefront. The resulting construction object wavefront 33 is then directed through the holographic plate 26. The resulting interference fringe pattern on the holographic plate 26 records a hologram containing the desired optical wavefront. The hologram could also be made by conventional computer generation techniques.

Figure 2:
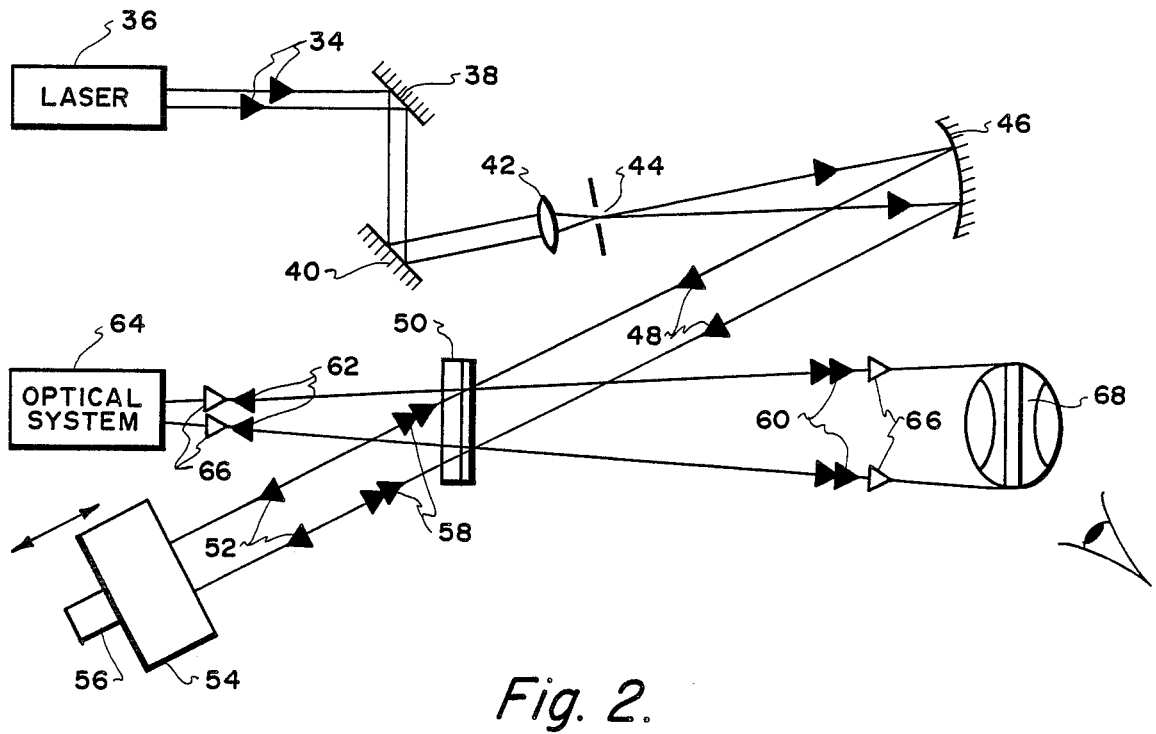
FIG. 2 is a schematic illustration of a preferred embodiment for playing back the hologram in accordance with the principles of the present invention.

When an optical system is desired to be tested, the hologram is reconstructed or played back. Referring now to FIG. 2, a wavefront 34 from laser source 36 is reflected off of alignment mirrors 38, 40 and is converged by lens 42. The wavefront 34 is then passed through a pinhole 44 which acts as a spatial filter. It diverges and is directed to a collimating mirror 46. The resulting reflected reconstruction wavefront 48 is used to reconstruct the object wavefront. The reconstruction wavefront 48 is essentially the same wavefront as the construction reference wavefront 25 if there is no wavelength detuning.

The reconstruction wavefront 48 is directed toward the hologram 50 which contains the record of the desired optical wavefront. A portion of the reconstruction wavefront 48 is diffracted and a portion is transmitted. The transmitted portion 52 is reflected off a retroreflector 54 which may be, for example, a flat mirror or a corner cube prism. The retroreflector 54 may be driven normal to the transmitted portion 52 by a conventional piezoelectric mirror mount or other driving means 56. The resulting reconstruction conjugate wavefront 58 is directed back toward the hologram 50 and thus forms, by diffraction, a reconstructed conjugate object wavefront or reference wavefront 60.

The reconstructed object wavefront 62, i.e. the desired optical wavefront, which is the diffracted portion of the reconstruction wavefront 48 enters the optical system 64 being tested along its optical axis. It is retroreflected from the optical system 64 and directed back through the hologram 50. The resulting retroreflected reconstructed object wavefront 66, is returned from the optical system 64 and interferes with the reconstructed conjugate object wavefront 60 to form a interference fringe pattern 68. The interference fringe pattern 68 shifts as a result of the movement of the retroreflector 54. This shifting provides a means for determining the sign of any aberrations. Appropriate conventional fringe reduction techniques may be used to determine the misalignment and aberrations of the optical system 64.

Figure 3:
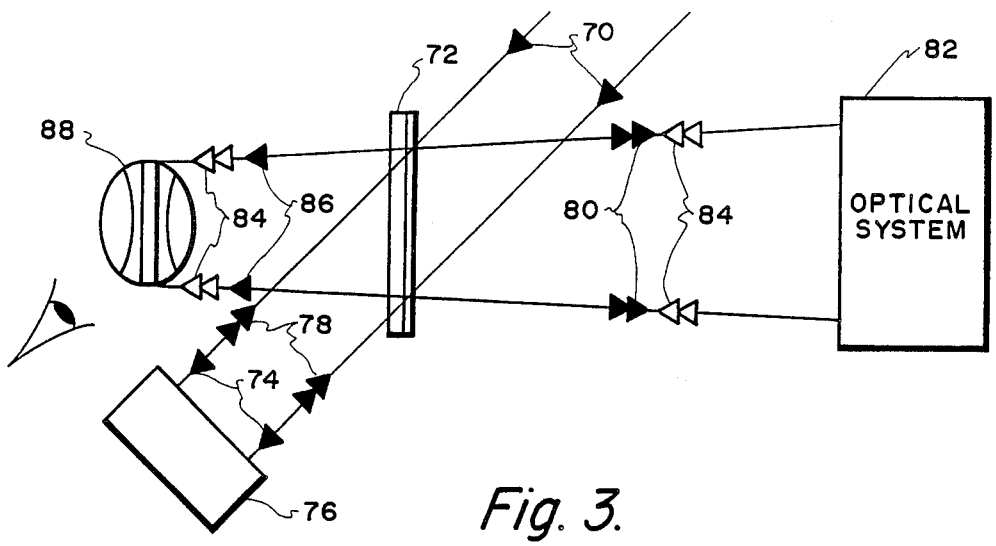
FIG. 3 illustrates a second preferred embodiment for playing back the hologram using an upstream interferometric approach.

In another embodiment, an upstream interferometric approach is utilized, as illustrated in FIG. 3. In this case, a reconstruction wavefront 70 may be formed as in the previous embodiment and is directed through the hologram 72. The transmitted portion 74 is reflected off a retroreflector 76. The resulting reconstruction conjugate wavefront 78, is directed back toward the hologram 72 and thus forms, by diffraction, a reconstructed conjugate object wavefront 80, i.e. the desired optical wavefront. This reconstructed conjugate object wavefront 80 is retroreflected from the optical system 82. The retroreflected reconstructed conjugate object wavefront 84 is passed through the hologram 72. It interferes with the reconstructed object wavefront 86, i.e. a reference wavefront, which is the diffracted portion of the reconstruction wavefront 70 and thereby forms an interference fringe pattern 88. Thus, by comparing the embodiments in FIGS. 2 and 3, it can be seen that either the reconstructed conjugate object wavefront or the reconstructed object wavefront may be used to interrogate an optical system.

Figure 4:
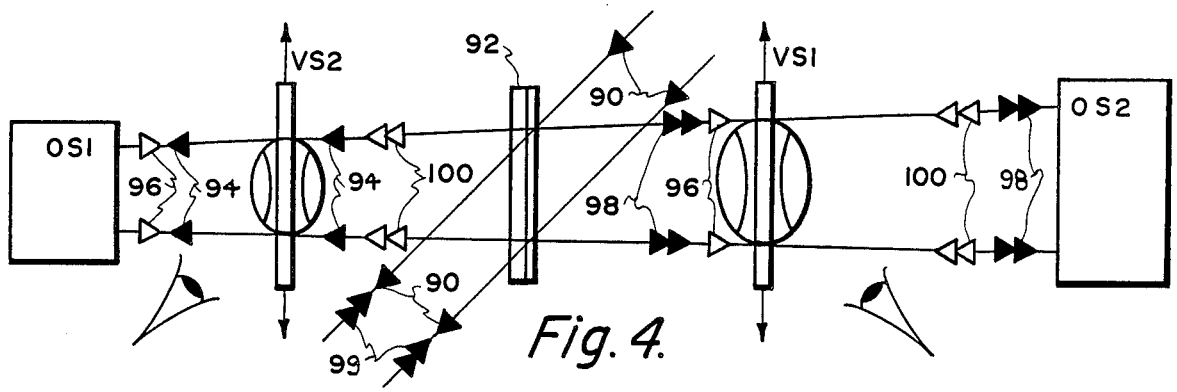
FIG. 4 is a schematic illustration showing the present invention being utilized to align two optical systems to each other.

The aforementioned concept illustrated in FIGS. 2 and 3 may be utilized to align two optical systems to each other, as shown in FIG. 4. The two optical systems are designated OS1 and OS2. A reconstruction wavefront 90 is formed and directed toward a hologram 92. When aligning OS1, a sensing element or view screen designated VS2 is removed. As in the FIG. 2 embodiment, the reconstructed object wavefront 94 is used to interrogate OS1. The retroreflected reconstructed object wavefront 96 passes through the hologram 92 and interferes with the reconstructed conjugate object wavefront 98 at a second sensing element or view screen designated VS1. (The reconstructed conjugate object wavefront 98 may be formed as described in the previous embodiments.) Thus, OS1 may be aligned to the desired optical wavefront which is reconstructed from the hologram 92.

Subsequently, as in the FIG. 3 embodiment, a reconstruction conjugate wavefront 99 is directed back toward the hologram 92 and thus forms a reconstructed conjugate object wavefront 98 which is used to interrogate OS2. When aligning OS2, VS1 is removed and the retroreflected reconstructed conjugate object wavefront 100 passes through the hologram 92 and interferes with the reconstructed object wavefront 94 at VS2. Thus, OS1 and OS2 may be aligned to each other.

Obviously, many modifications and variations of the present invention are possible in light of the above teachings. It is therefore to be understood that, within the scope of the appended claims, the invention may be practiced otherwise than as specifically described.

For example, the reconstruction and conjugate reconstruction wavefronts could be shifted in frequency to produce a shifting fringe pattern and thereby allow heterodyne interferometry.

What is claimed and desired to be secured by Letters Patent of the United States is:

1. An apparatus for testing an optical system having an optical axis and a desired optical wavefront, comprising:
    a hologram containing a recording of said desired optical wavefront, said hologram being located on said optical axis;
    means for producing said desired optical wavefront, said desired optical wavefront being directed toward said optical system and retroreflected therefrom containing any aberrations of the optical system under test, the retroreflected wavefront being passed through said hologram; and
    means for producing a reference wavefront which is substantially conjugate to said desired optical wavefront, said reference wavefront interfering with said retroreflected desired optical wavefront thereby producing an interference fringe pattern characterizing the optical system under test.

2. The apparatus of claim 1 wherein said means for producing said desired optical wavefront includes means for forming a reconstruction wavefront, said reconstruction wavefront being directed through said hologram and being divided into a reconstructed object wavefront which is diffracted by said hologram and a transmitted wavefront which is transmitted by said hologram, said reconstructed object wavefront entering said optical system along said optical axis and being returned from said optical system and directed through said hologram, said reconstructed object wavefront conveying any aberrations of said optical system.

3. The apparatus of claim 2, wherein said means for producing a reference wavefront which is substantially conjugate to said desired optical wavefront includes means for forming a wavefront being substantially conjugate to said reconstruction wavefront, said substantially conjugate wavefront being directed through said hologram and thus forming a diffracted reconstructed conjugate object wavefront which interferes with said reconstructed object wavefront being returned from said optical system thereby producing said interference fringe pattern which characterizes the optical system under test.

4. The apparatus of claim 1, wherein said means for producing said reference wavefront includes means for shifting the phase of said reference wavefront thereby shifting said interference fringe pattern for determining the sign of any aberrations.

5. The apparatus of claim 3, wherein said reconstruction wavefront is a plane wavefront, said means for producing a wavefront being substantially conjugate to said reconstruction wavefront including a flat mirror.

6. The apparatus of claim 3, wherein said reconstruction wavefront is a plane wavefront, said means for providing a wavefront being substantially conjugate to said reconstruction wavefront including a corner cube prism.

7. The apparatus of claim 1 wherein said means for producing said desired optical wavefront includes:
means for producing a reconstruction wavefront, said reconstruction wavefront being directed through said hologram and being divided into a reconstructed object wavefront which is diffracted by said hologram and a transmitted wavefront which is transmitted by said hologram; and
retroreflecting means for retroreflecting said transmitted wavefront back toward said hologram and thereby forming, by diffraction, a reconstructed conjugate object wavefront.

8. The apparatus of claim 7 wherein said means for producing said reference wavefront which is substantially conjugate to said desired optical wavefront is said reconstructed object wavefront which is diffracted by said hologram.

9. The apparatus of claim 8 wherein said reconstruction wavefront is a plane wavefront, said means for producing a wavefront being substantially conjugate to said reconstruction wavefront including a flat mirror.

10. The apparatus of claim 8 wherein said reconstruction wavefront is a plane wavefront, said means providing a wavefront being substantially conjugate to said reconstruction wavefront including a corner cube prism.

11. An apparatus for testing an optical system having an optical axis and a desired optical wavefront, comprising:
a hologram containing a recording of said desired optical wavefront, said hologram being located on said optical axis;
means for producing a reconstruction wavefront, said reconstruction wavefront being directed through said hologram and being divided into a reconstructed object wavefront which is diffracted by said hologram and a transmitted wavefront which is transmitted by said hologram, said reconstructed object wavefront entering said optical system along said optical axis and being returned from said optical system and directed through said hologram, said reconstructed object wavefront conveying any aberrations of said optical system; and
means for producing a wavefront being substantially conjugate to said reconstruction wavefront, said substantially conjugate wavefront being directed through said hologram and thus forming a diffracted reconstructed conjugate object wavefront which interferes with said reconstructed object wavefront being returned from said optical system thereby producing an interference fringe pattern characterizing the optical system under test.

12. An apparatus for aligning a first optical system and a second optical system to a common optical axis, said first optical system having a first desired optical wavefront and said second optical system having a second desired optical wavefront being substantially conjugate to said first desired optical wavefront, comprising:
a hologram containing a recording of said first desired optical wavefront, said hologram being located on said common optical axis;
means for producing said first desired optical wavefront, said first desired optical wavefront being directed toward said first optical system and retroreflected therefrom containing any aberrations induced by misalignment of said first optical system, the retroreflected wavefront being passed through said hologram;
means for producing a first reference wavefront which is substantially conjugate to said first desired optical wavefront, said first reference wavefront interfering with said retroreflected first desired optical wavefront thereby producing a first interference fringe pattern characterized the first optical system under test;
a first insertable sensing element which is placed on said common optical axis for the purpose of sensing said first interference fringe pattern characterizing the misalignment of said first optical system from said common optical axis;
means for producing said second desired optical wavefront, said second desired optical wavefront being directed toward said second optical system and retroreflected therefrom containing any aberrations induced by misalignment of said second optical system, the retroreflected wavefront being passed through said hologram;
means for producing a second reference wavefront which is substantially conjugate to said second desired optical wavefront, said second reference wavefront interfering with said retroreflected second desired optical wavefront thereby producing a second interference fringe pattern characterizing the second optical system under test; and
a second insertable sensing element which is placed on said common optical axis for the purpose of sensing said second interference fringe pattern characterizing the misalignment of said first optical system from said common optical axis.

13. A method for testing an optical system having an optical axis and a desired optical wavefront, comprising the steps of:
   providing a hologram containing a recording of said desired optical wavefront, said hologram being located on said optical axis;
   producing said desired optical wavefront, said desired optical wavefront being directed toward said optical system and retroreflected therefrom containing any aberrations of the optical system under test, the retroreflected wavefront being passed through said hologram; and
   producing a reference wavefront which is substantially conjugate to said desired optical wavefront, said reference wavefront interfering with said retroreflected desired optical wavefront thereby producing an interference fringe pattern characterizing the optical system under test.

14. The method of claim 13 wherein said desired optical wavefront is produced by forming a reconstruction wavefront, said reconstruction wavefront being directed through said hologram and being divided into a reconstructed object wavefront which is diffracted by said hologram and a transmitted wavefront which is transmitted by said hologram, said reconstructed object wavefront entering said optical system along said optical axis and being returned from said optical system and directed through said hologram, said reconstructed object wavefront conveying any aberrations of said optical system.

15. The method of claim 14, wherein said reference wavefront which is substantially conjugate to said desired optical wavefront is produced by forming a wavefront being substantially conjugate to said reconstruction wavefront, said substantially conjugate wavefront being directed through said hologram and thus forming a diffracted reconstructed conjugate object wavefront which interferes with said reconstructed object wavefront being returned from said optical system thereby producing said interference fringe pattern which characterizes the optical system under test.

16. The method of claim 13, including the step of shifting the phase of said reference wavefront thereby shifting said interference fringe pattern for determining the sign of any aberrations.

17. A method for aligning a first optical system and a second optical system to a common optical axis, said first optical system having a first desired optical wavefront and said second optical system having a second desired optical wavefront being substantially conjugate to said first desired optical wavefront, comprising:
   forming a hologram containing a recording of said first desired optical wavefront, said hologram being located on said common optical axis;
   producing said first desired optical wavefront, said first desired optical wavefront being directed toward said first optical system and retroreflected therefrom containing any aberrations induced by misalignment of said first optical system, the retroreflected wavefront being passed through said hologram;
   producing a first reference wavefront which is substantially conjugate to said first desired optical wavefront, said first reference wavefront interfering with said retroreflected first desired optical wavefront thereby producing a first interference fringe pattern characterizing the first optical system under test;
   inserting a first sensing element on said common optical axis for the purpose of sensing said first interference fringe pattern characterizing the misalignment of said first optical system from said common optical axis;
   removing said first sensing element from said common optical axis;
   producing said second desired optical wavefront, said second desired optical wavefront being directed toward said second optical system and retroreflected therefrom containing any aberrations induced by misalignment of said second optical system, the retroreflected wavefront being passed through said hologram;
   producing a second reference wavefront which is substantially conjugate to said second desired optical wavefront, said second reference wavefront interfering with said retroreflected second desired optical wavefront thereby producing a second interference fringe pattern characterizing the second optical system under test; and
   inserting a second sensing element on said common optical axis for the purpose of sensing said second interference fringe pattern characterizing the misalignment of said first optical system from said common optical axis

* * * * *